(12) United States Patent
Hibbets

(10) Patent No.: US 9,466,062 B2
(45) Date of Patent: Oct. 11, 2016

(54) TIERED INCENTIVE PROGRAM

(75) Inventor: Jason S. Hibbets, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1841 days.

(21) Appl. No.: 11/845,436

(22) Filed: Aug. 27, 2007

(65) Prior Publication Data

US 2009/0063260 A1    Mar. 5, 2009

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |
| *G06Q 50/00* | (2012.01) | |

(52) U.S. Cl.
CPC .......... *G06Q 30/02* (2013.01); *G06Q 30/0212* (2013.01); *G06Q 50/01* (2013.01)

(58) Field of Classification Search
CPC ...................................................... G06Q 50/01
USPC ................................................... 705/1.1–912
See application file for complete search history.

(56) References Cited

U.S. PATENT DOCUMENTS 7,752,251 B1 *   7/2010   Shuster et al. ................ 709/200

* cited by examiner

*Primary Examiner* — Jonathan Ouellette
(74) *Attorney, Agent, or Firm* — Lowenstein Sandler LLP

(57) ABSTRACT

An embodiment relates generally to a method of offering incentives. The method includes receiving a registration event of a newly registered user and designating a probationary status for the newly registered user. The method also includes accumulating probationary points for a probationary sum based on at least one answer posted by the newly registered user in a forum and elevating the newly registered user to a status of a rated user in response to the probationary sum exceeding a predetermined threshold.

18 Claims, 7 Drawing Sheets

TIERED INCENTIVE PROGRAM

FIELD

This invention relates generally to forums, more particularly, to systems and methods for a tiered incentive program in a forum.

DESCRIPTION OF THE RELATED ART

A forum can be regarded as essentially a website composed of a number of member-written threads. Each thread entails a discussion or conversation in the form of a series of user-member written posts. These threads remain saved on the forum website for future reading indefinitely or until deletion by a moderator.

Software packages that implement forum websites are generally well known. These software packages are widely available on the Internet in a variety of programming languages such as HypeterText Preprocess ("PHP"), Perl, Java, and active server pages ("ASP"). The configuration and records of posts can be stored in text files or in a database.

Social network sites often feature forums to discuss topics that are of interest to the user community for these social networks. Topics of discussion in these forums can range from social, politics, hobbies, and technical. Some forums can be more popular such as hobbies and social forums, the participation of the users can be very high.

However, for technical forums or other esoteric topical forums, participation can be less popular. The site administrators have devised incentive reward programs to increase participation. For example, a forum can award a point for posting an answer to a question. As a user keeps posting answers, the user can accumulate enough points to qualify for a reward.

The incentive reward programs in forums has generally increased participation and speed of obtaining answers to posted questions. However, there are drawbacks and disadvantages to these incentive reward programs. For instance, some unscrupulous users have posted non-informing answers such as "No", "YES" or "." in order to accumulate points more quickly. Accordingly, these type of non-informing answers clutter the forum with useless information.

Another drawback can be the correctness, validity, or reliability of an answer to a posted question. Although an answer posted can appear to be authoritative and correct, a reviewing user can never be sure that the posting user is skilled and competent to have correctly answer the question.

There is a need in the art to reduce the useless information especially in forums with incentive reward programs as well as providing information that is highly reliable and correct.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to methods and system for a tiered incentive system in a forum, where a user community can provide answers to questions posted on the forum. More particularly, a tiered incentive module can be configured to qualify users as reputable. Unlike conventional forums (e.g., Yahoo Answers) where users posting answers automatically receive points, the tiered incentive module can be configured to initially place new registered users of the forum in a trial or probation period as probationary users. As the probationary user continues to post answers in the forum, the posted answers are forwarded to a review group formed by the system administrators, which can appoint reputable members of the user community to a peer review group. The peer review group can award probationary points to the answer posted by the probationary user as well as give a rating to the probationary user. Once the probationary user has accumulated enough points and/or has a high enough rating, the probationary user can be elevated to a rated user.

The user can now be eligible for a forum incentive program as a rated user. The forum incentive program can be a program that rewards users for participating in the forum. As a rated user answers questions from the user community, the rated user accumulates incentive points as well as ratings on the posted answers. As the points accumulate, the user can become eligible for prizes such as software, training, or similar rewards as designated by the system administrators of the forum.

The rated user can also be designated with a rank. The initial rank of a rated user can be a single star with the potential of achieving a five-star ranking with enough high ratings. The higher rank can indicate that the user is highly reputable and a reliable source of information. Accordingly, the tiered incentive program can screen a large number of users to a smaller group of reputable well-informed users who can provide high quality and useful answers for the user community.

Figure 1:
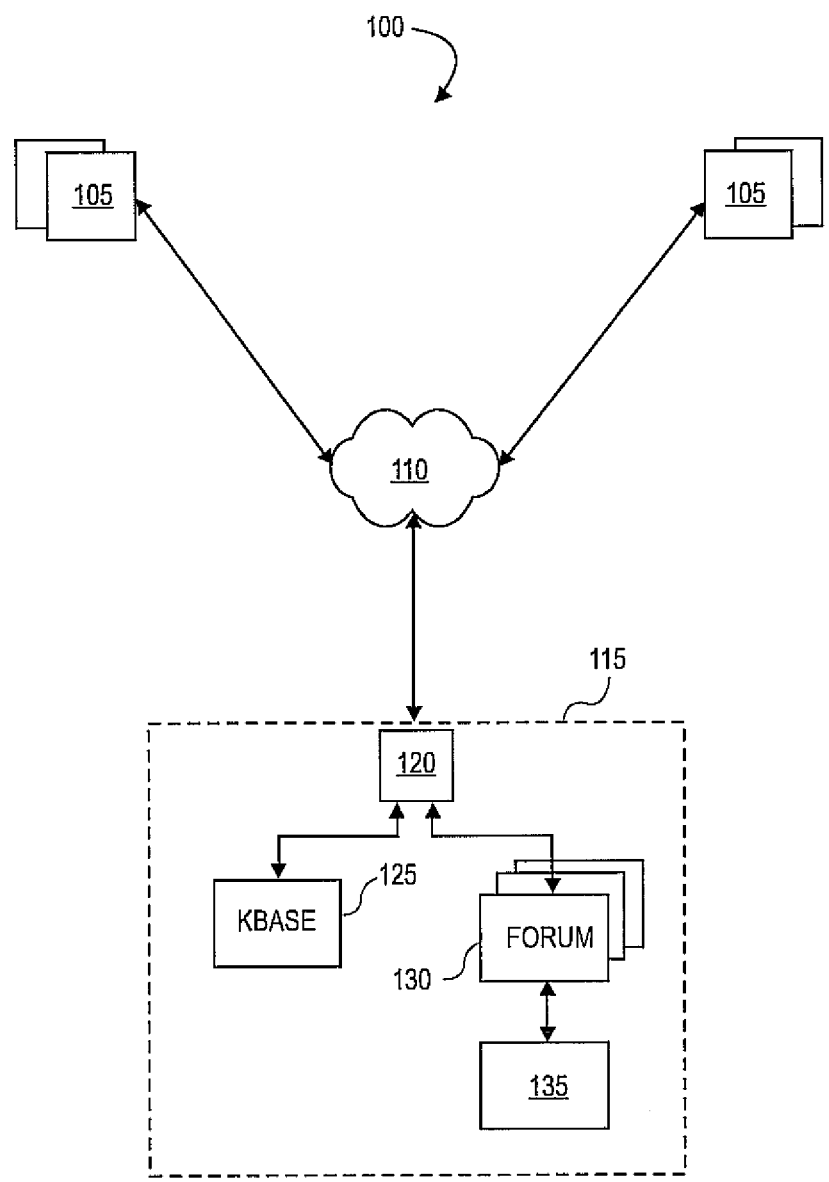
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a service portal 115. The users 105 can be private individuals, employees of private business or public entities or other persons interested in accessing the service portal 115. The users 105 can access the service portal 115 using personal computers, personal mobile devices, workstations or other networked computing platforms.

The network 110 can be a combination of wide area and local area networks such as the Internet. The network 110 can be configured to provide a communication channel between the users 105 and the service portal 115. The network 110 can implement a variety of network protocols to provide the communication channel such as Internet Protocol ("IP") Vx, ATM, SONET, or other similar network protocols.

The service portal 115 can be configured to provide products and services to the user 105 as well as provisioning, installation services, updates to software and hardware products and technical support. The service portal 115 can, among other functions, provide a list of products such as software applications and/or hardware devices as well as services such as installation, configuration, maintenance, etc., for users to purchase. As a non-limiting example, the service portal 115 can also provide information for users to research, compare and purchase software, hardware and consulting services in support of those software and/or hardware purchases. The service portal 115 can also be configured to provide support services by subscription to those same software, service, and/or hardware purchase.

In accordance with various embodiments, the service portal 115 can be configured to provide a knowledge library 120. The knowledge library 120 provides a resource for users to resolve technical issues regarding products and/or services provided by the service portal 115. The knowledge library 120 can contain a knowledgebase 125, forum(s) 130, and frequently asked questions, etc. The knowledgebase 125 can be comprised of a database of Wiki-style articles that can be searched, revised and added thereto. The forums 130 can provide a mechanism for a user with issues or problems to post questions and receive assistance from the user community.

In an effort to ensure quality answers are posted in the forum from reputable users, a tiered incentive module 135 can be configured to manage the forums 130 of the knowledge library 120 and can be configured to qualify users as reputable. More particularly, the tiered incentive module 135 can be configured to initially place newly registered users of a forum 130 in a trial or probation period as probationary users. As the probationary user continues to post answers in the forum, the posted answers are forwarded to a group formed by the system administrators, which can appoint reputable members of the user community to a peer review group. The peer review group can award probationary points to the answer posted by the probationary user as well as give a rating to the probationary user. Once the probationary user has accumulated enough points and/or has a high enough rating, the probationary user can be elevated to a rated user.

The promoted user can now be eligible for a forum incentive program as a rated user. More specifically, the tiered incentive module 135 can manage a forum incentive program that rewards users for participating in the forum(s) 130. As a rated user answers questions from the user community, the rated user accumulates incentive points as well as ratings on the posted answers. As the points accumulate, the user can become eligible for prizes such as software, training, or similar rewards as designated by the system administrators of the forum. The tiered incentive module 135 can be configured to maintain the incentive points for the user.

The rated user can also be designated with a rank. The initial rank of a rated user can be a single star with the potential of achieving a five-star ranking with enough high ratings. The higher rank can indicate that the user is highly reputable and a reliable source of information. The tiered incentive module 135 can be further configured to maintain the ranking of each user. Accordingly, the tiered incentive module 135 can screen a large number of users to a smaller group of reputable well-informed users who can provide high quality and useful answers for the user community.

Figure 2:
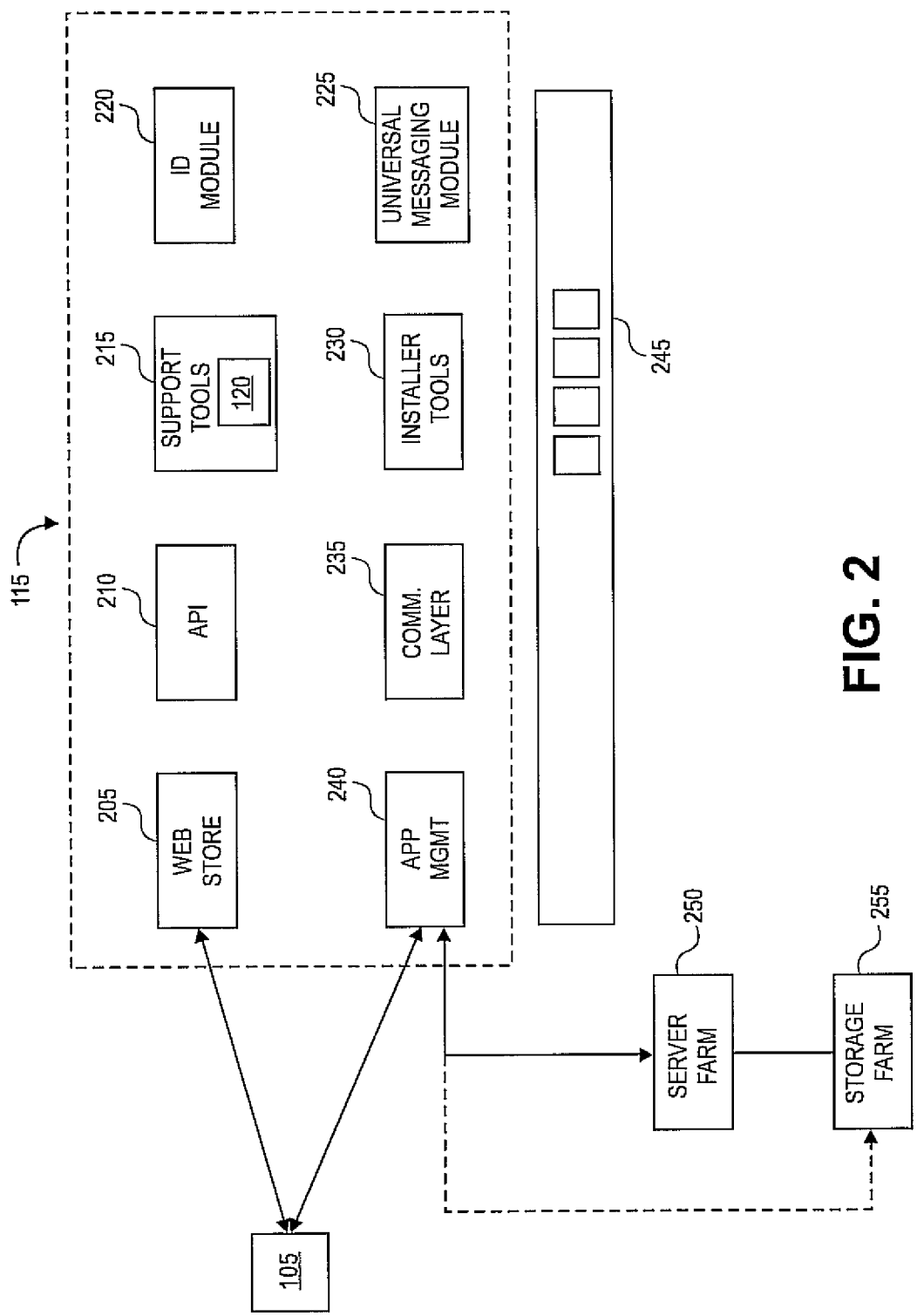
FIG. 2 illustrates an exemplary service portal of the system shown in FIG. 1 in accordance with another embodiment.

FIG. 2 illustrates a more detailed block diagram of the service portal 115 in accordance with another embodiment. It should be readily apparent to those of ordinary skill in the art that the service portal 115 depicted in FIG. 2 represents a generalized schematic illustration and that other components may be added or existing components may be removed or modified.

As shown in FIG. 2, the service portal 115 can include a web store module 205 that a user can interface with the service portal. The web store module 205 can provide the graphical user interfaces ("GUIs") and associated functions and/or services for the service portal 115. As an non-limiting example, the web store module 205 can generate a log-in GUI for a user to authenticate and enter the service portal 115.

The web store module 205 can couple with an application program interface ("API") module 210. The API module 210 can be configured to provide an interface between the functions and/or services provided by the web store module 205 and to the appropriate module of the service portal 115. More particularly, the API module 210 can call or direct a requested function or service from the user to the respective module that provides that requested function or service. For example, a user may request a price of a product, e.g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the service portal 115. The support tools module 215 can contain and provide access to databases that contain information such as product lines, services providers, on-line self-help (e.g., knowledge library 120), etc. The support tools module 215 can also provide services like a chat service, a help desk, installation, provisioning, etc.

The API module 210 can be further configured to couple with an identification ("ID") module 220. The ID module 220 can be configured to provide identification management services for the service portal 115. The ID module 220 can also store information related to users such as purchase history, user profile, usage history of the user, and entitlement data.

The API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the service portal 115 can be the purchase of software applications provided by independent software vendors ("ISVs"). As part of the delivery of the software applications, the ISV can be required to maintain and update the installation tools to install their respective software applications. Accordingly, the installer tools 230 can be a repository where independent software vendors can deposit their respective installation tools.

The API module 210 can be further coupled to the communication layer 235 (labeled as COMM layer in FIG. 2). The communication layer 235 can be configured to provide the underlying services for the modules of the service portal 115 to communicate. For example, the communication layer 235 can contain middleware for a product database to communicate with a graphical user interface requesting product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program) from the service portal 115, which is stored in an application stack module 245. The application management module 240 can then deliver the purchased software application stack, install and configure the software application stack at a third party site such as a server farm 250 or store the software application stack in a storage farm 255 for the user to retrieve.

The server farm 250 can be configured to provide computing platforms for users to lease. Accordingly, users can have a backup version of their systems, a testing platform to perform quality assurance tests on new applications, execute a program requiring excess MIPS, or any other similar computing task.

The storage farm 255 can be configured to provide storage space for users to lease. Accordingly, users can lease disk storage space to back up data, provide a hot data swap, or other storage intensive tasks.

In some embodiments, the tiered incentive module 135 can be configured to be executed in the support tools module 215. In other embodiments, the tiered incentive module 135 can be a module of the ID module 220. In yet other embodiments, the tiered incentive module 135 can be executed as a standalone module.

Figures 3, 4:
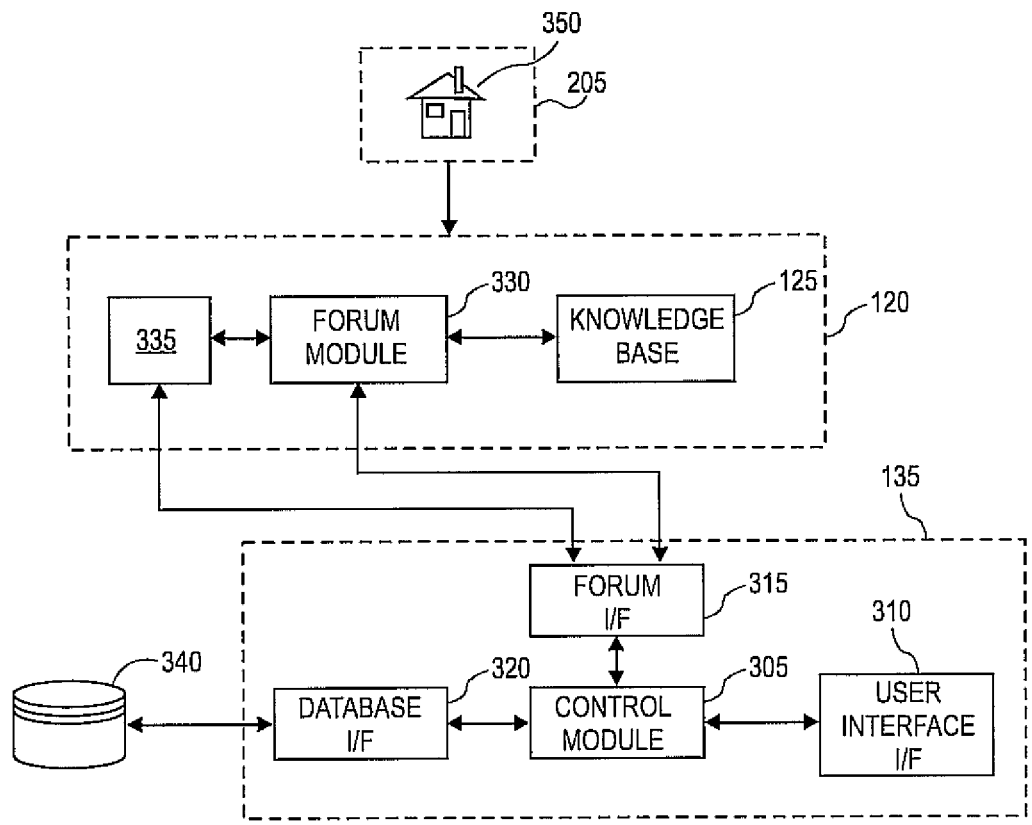
FIG. 3 depicts an exemplary tiered incentive module shown in FIG. 1 in accordance with yet another embodiment.
FIG. 4 illustrates an exemplary forum user profile schema in accordance with yet another embodiment.

FIG. 3 depicts a more detailed block diagram of the tiered incentive module 135 in accordance with another embodiment. It should be readily apparent to those of ordinary skill in the art that the tiered incentive module 135 depicted in FIG. 3 represents a generalized schematic illustration and that other components may be added or existing components may be removed or modified.

As shown in FIG. 3, the tiered incentive module 135 can comprise a control module 305, a user interface module 310, a forum interface module (labeled as "FORUM I/F" in FIG. 3) 315, and a database interface module (labeled as "DATABASE I/F" in FIG. 3) 320. It should be readily obvious to one of ordinary skill in the art that the depicted modules 305-345 can be implemented as software applications (programmed in C, C++, JAVA, PHP, etc.), hardware components (EEPROM, application specific integrated circuit, microprocessor, etc.) or combinations thereof.

The control module 305 can be configured to manage and to interface with the other modules 310-320 to provide the functionality of the tiered incentive module 135 as described above and Further described herein below.

The user interface module 310 can be configured to generate graphical user interfaces ("GUIs") as required by the control module 305. For example, the user interface module 310 can generate a notification GUI and/or a link to the notification GUI. The notification GUI can notify a user that they has been elevated from probationary status to a rated or verified status.

In some embodiments, the user interface module 310 can be considered an application program interface module which provides the necessary tools and interfaces to communicate with other modules of the tiered incentive module 135 and the other modules of the service portal 115.

The control module 305 can also be coupled to a forum interface module 315. The forum interface module 315 can provide a communication channel to monitor posted answers in a forum module 330 of a knowledge library 120 that provides forum(s) 130. As an non-limiting example, the forum module 330 can provide at least one forum for registered and unregistered users to receive technical assistance from the user community of the service portal 115.

The forum module 330 can be coupled to a knowledgebase 125. The knowledgebase 125 can comprise of a Wiki-style database that allows articles to be rated and commented on by registered users and viewable by all users. The content within the knowledgebase 125 can be articles in a question and answer format in some embodiments. Other formats can also be implemented in the knowledgebase 125 such as frequently asked questions, articles, etc.

The forum module 330 can also be coupled to an incentive reward program module 335. The incentive reward program module 335 can be configured to award rewards based on the accumulation of points. In some embodiments, users can be awarded point(s) for posting answers in the forum providing assistance to other members of the user community, editing technical documents, or translating articles, documents, or other forms of content in the forum module 330 or knowledgebase 125. As the point total or sum grows, the user can qualify for rewards on a graduated scale. As a non-limiting example, a user can qualify for a training session for product A when the user accumulates point sum of x. Alternatively, the user can opt to keep accumulating points to qualify for software product B at point sum y. Regardless the type of awards or point system, the incentive reward program module 335 can provide rewards for users that continually assist in the forum(s) 130.

Although the incentive reward program module 335 is shown coupled to the forum module 330, the incentive reward program module 335 could be executed by the control module 305, the other modules of the service portal 115 or be executed as a separate standalone module.

The control module 305 can be further coupled to a database interface 320. The database interface 320 can provide an interface for the control module 305 to interact with a persistent storage device that executes a forum user profile database 340. A database server (not shown) can execute a database program that provides forum user profile database 340 as known to those skilled in the art. Accordingly, the control module 305 can create, store, and update the forum user profiles to qualify users as well as manage the participation of a user in an incentive rewards program.

Users can access the knowledge library 120 from a home page 350 displayed when a user is authenticated into the web store 205 of the service portal 115. More specifically, after log-in, the web store can display the home page 350. The home page 350 can be configured to display a link (not shown) to the knowledge library 120. A user can then activate the link to be taken to a knowledge library home page (not shown). The knowledge library page can then display links to the forum(s) 130 or the knowledgebase 125.

FIG. 4 illustrates an exemplary schema 400 for the forum user profile in accordance with yet another embodiment. It should be readily apparent to those of ordinary skill in the art that the schema 400 depicted in FIG. 4 represents a generalized schematic illustration and that other steps may be added or existing steps may be removed or modified.

As shown in FIG. 4, the profile data schema 400 can comprise a user identification field 405, a first name field 410, a last name field 415, a status 420, a point sum 425, a rating field 430, a last login field 435 and a user history field 440. It should be readily obvious to one of ordinary skill in the art that the schema 400 is a schematic representation and that additional fields could be added or the existing fields may be removed or amended without departing from the scope of the claimed invention.

The user identification (labeled as "USER ID") field 405 can store the log-in name of the user to access the forum 130. The user can obtain a user ID when the user registers in the forum 130.

The first name field 410 can store the first name of the legal name of the user. Similarly, the last name field 415 can store the surname of the legal name of the user.

The status field 420 can store the status of the user as either probationary or non-probationary, i.e., admitted, verified, rated, vetted, etc. As a rated or non-probationary user, the user can then be eligible to participate in the incentive reward program.

The point sum field 425 can store two types of data. As a probationary user, the point sum field 425 can store the probationary points given to the user by the peer review group. As a non-probationary user, the point sum field 425 can store the incentive points for answering or assisting in the forum 130.

The rating field 430 can be configured to store a ranking or rating of the user in a subfield 430A as well as rating point sum in subfield 430B. The rating subfield 430A can store the current rating of the user. For example, the user can be evaluated on a one to five star scale, where higher the number of stars indicate a higher reputation in the user community.

The user community can also evaluate the answers posted by a particular user. The user community can rate the answer on a five star system, where one star is the lowest rating and five star is the highest rating. Rating points can be assigned to each rating. The rating points are accumulated as a rating point sum in the rating point subfield 430B. Another method of rating an answer could be awarding a "thumbs up" or a "thumbs-down" to the user for his posted methods and accumulating the number of "thumbs up" or a "thumbs-down" can indicate the reputation of the user. Other rating systems could be used to evaluate the ratings so long as the other rating systems provide a mechanism to provide a reputation or ranking of the user.

The last log-in field 435 can be configured to store the previous log-in date and time when the user last visited the forum 130. The user history field 440 can be configured to contain information related to the past visits of the user to the forum 130. This field 430 can contain the number of visits to the forum 130, the number of posts to the forum 130, or other activities that the system administrator would like to track. This information can then be used to improve the existing functionality of the forum 130 or to add additional functions.

Figure 5:
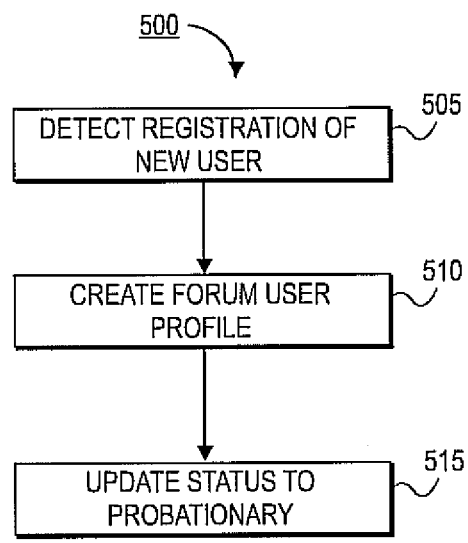
FIG. 5 depicts an exemplary registration flow diagram in accordance with yet another embodiment.

FIG. 5 illustrates an exemplary registration flow diagram 500 in accordance with yet another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, the control module 305 can detect a registration the of a new user to the forum 130, in step 505. More particularly, the control module 305 can receive a message from the forum module 330 that a new user has registered in the forum 130.

In step 510. the control module 305 can be configured to populate a record with the information required by the forum user profile 400 shown in FIG. 4. The control module 305 can retrieve some of the information such as first name and last name from the ID module 220.

In step 515, the control module 305 can be configured to update the user profile. For example, the control module 305 can set the point sum field 425 to zero, set the status of the user as "probationary", and set last login field 435 to the current date. Subsequently, the control module 305 can store the update forum user profile to the forum user profile database 340 through the database interface 320.

Figure 6:
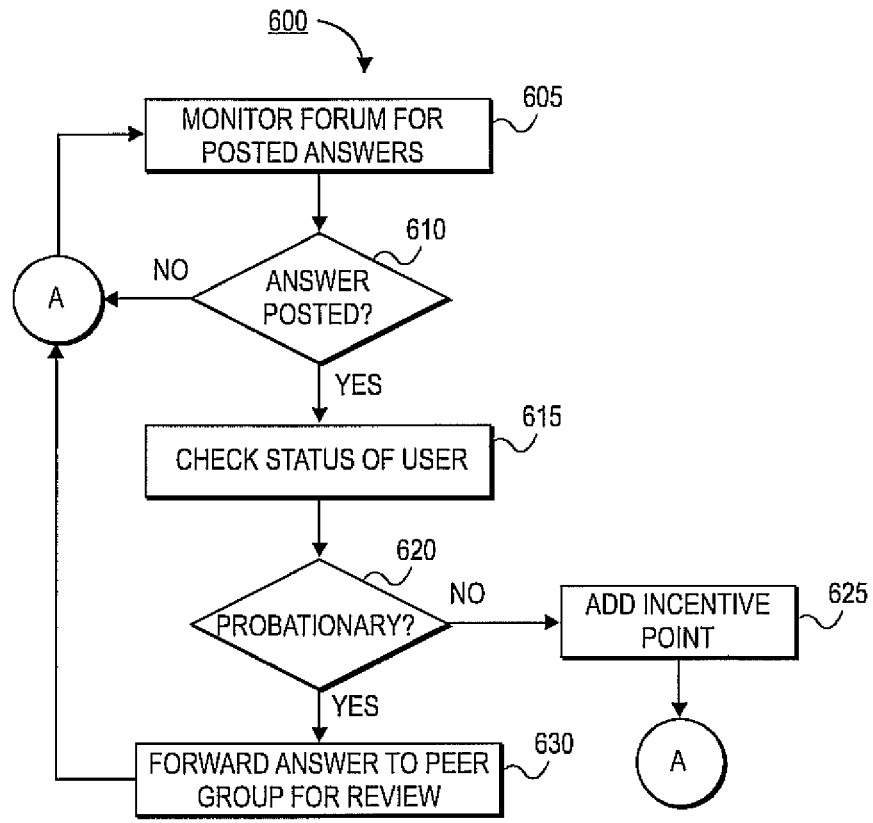
FIG. 6 illustrates an exemplary monitoring flow diagram in accordance with yet another embodiment.

FIG. 6 illustrates an exemplary monitoring flow diagram 600 executed by the control module 305 in accordance with yet another embodiment. As depicted in FIG. 6, the control module 305 can be configured to monitor the forum module 330 for posted answers, in step 605. More particularly, the control module 305 can be configured to monitor the activity of the user community in the forum 130 provided by the forum module 330.

In step 610, the control module 305 can be configured to determine whether an answer to a question has been posted. More particularly, the control module 305 can query the forum module 330 or the forum module 330 can be configured to forward a copy of the posted answer to the control module 305.

If the control module 305 determines that no answer has been posted in the forum 130 provided by the forum module 330, the control module 305 can return to the processing of step 605.

Otherwise, if the control module 305 can detect a new answer posted in the forum 130, the control module 305 can be configured to check the status of the user, in step 615. More particularly, the control module 305 can retrieve the user identification from the posted answer and query the forum user profile database 340 with the user identification and a request for a status associated with the user identification as search terms. The forum user profile database 340 can then return the status to the control module 305.

In step 620, the control module 305 determines whether the user has a probationary status. For example, the control module 305 can retrieve status of the user from the status field 420. If the user is a non-probationary user, the control module 305 can be configured to add an incentive point(s)

to the user. The incentive points are added to the existing sum in the point sum field 425 of the forum user profile 400 and then stored in the forum user profile database 340.

Otherwise, if the user has a probationary status, the control module 305 can forward the posted answer to a predetermined peer review group for evaluation. More specifically, the control module 305 can invoke the user interface module 310 to generate an evaluation form for the peer review group. The evaluation form along with the answer then sent to the peer review group. Alternatively, a link to the evaluation form can be sent with a copy of the posted answer to the peer review group.

The peer review group can be a group of volunteer vetted users of the user community that evaluate probationary users of the forum 130. The size of the peer review group can be any size as required by the service requirements of the service portal 115. The members of the peer review group can be appointed by system administrators, technical support personnel, or other administrating group of the service portal 115. Subsequently, the control module 305 can return to the processing of step 605.

Figure 7:
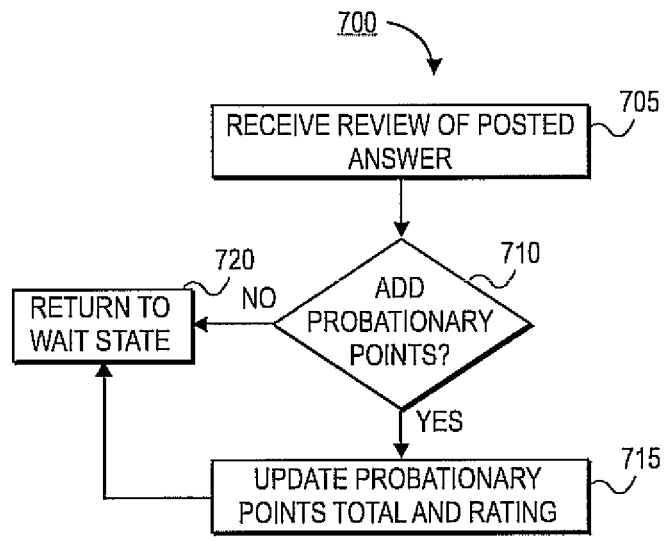
FIG. 7 depicts an exemplary probationary point update flow diagram in accordance with yet another embodiment.

FIG. 7 illustrates an exemplary probationary point update flow diagram 700 executed by the control module 305 in accordance with yet another embodiment. As shown in FIG. 7, the control module 305 can be configured to receive review of a posted answer from a member of the peer review group, in step 705. Alternatively, the control module 305 can receive the review from the web page whose address was sent in an electronic mail message to the peer review group member.

In step 710, the control module 305 can be configured to determine whether to add probationary points for the user who posted the selected answer. More particularly, the evaluation form can contain a GUI widget that allows the peer group member to allow the user to receive a probationary point as well as another GUI widget to give a rating for the posted answer.

If the probationary point(s) are being awarded, the control module 305 can add the designated probationary point(s) to the point sum field 425 and the rating in the rating field 430 of the forum user profile 400. The updated information can then be returned to the forum profile user database 340 through the database interface module 320. Subsequently, the control module 305 can return to a wait state until the next review arrives, in step 720. Otherwise, if the control module 305 determines that probationary point(s) are not to be awarded, the control module 305 proceeds to the processing associated with step 720.

Figure 8:
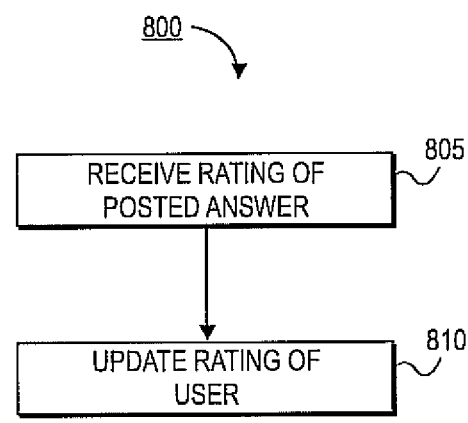
FIG. 8 depicts an exemplary rating update flow diagram in accordance with yet another embodiment.

FIG. 8 illustrates an exemplary rating update flow diagram 800 executed by the control module 305 in accordance with yet another embodiment. As shown in FIG. 8, the control module 305 can be configured to receive a copy of rating of a posted answer from the forum module 330, in step 805. The control module 305, in step 810, then updates the rating for the user who posted the selected answer. More specifically, the control module 105 can query for the associated forum user profile record using the user identification of the posted as a search term. The control module 305 can then update the rating field 430 with the received rating. The control module 305 can then return the updated record to the forum profile user database 340.

Figure 9:
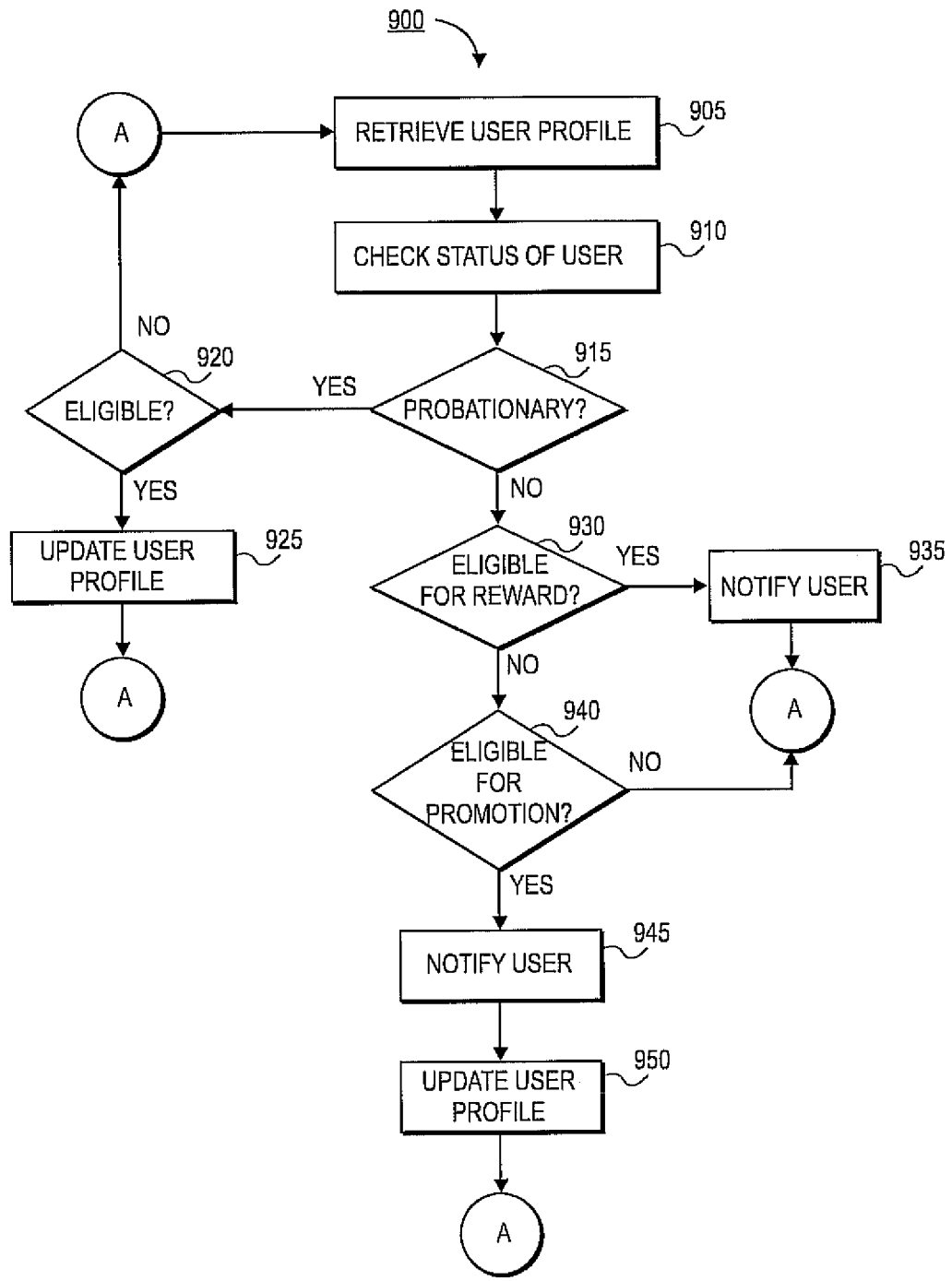
FIG. 9 illustrates an exemplary user update flow diagram in accordance with yet another embodiment.

FIG. 9 depicts an exemplary promotion flow diagram 900 in accordance with yet another embodiment. As shown in FIG. 9, the control module 305 can be configured to retrieve a forum user profile, in step 905. In some embodiments, the control module 305 can periodically execute this flow diagram and examines each registered user of the forum(s) 130 provided by the forum module 330.

In step 910, the control module 305 can determine the status of the user by retrieving the status from the status field 420 of the forum user profile record 400. If the control module 305 determines that the user has a probationary status, in step 915, the control module 305 can then determine whether the user has accumulated enough point to be promoted or elevated to an unconditional, rated, verified, vetted or other similar term to indicate a full member of the forum 130, in step 920. More particularly, the control module 305 can retrieve the probationary point sum value from the point sum field 425 of the forum user profile record 400 and compare the point sum value with a predetermined value.

If the user has not accumulated enough probationary points, the control module can then retrieve the next user, in step 905. Otherwise, the control module 305 can be configured to update the forum user profile. More specifically, the control module can set the point sum value to zero and store the updated value in the point sum field 425. The control module 305 can also change the status to non-probationary in the status field 420. The control module 305 can the store the updated record in the forum profile user database 340. Subsequently, the control module 305 can retrieve the next user, in step 905.

Returning to step 915, if the user is a full member, the control module 305 can determine whether the user is eligible for a reward in step 930. Particularly, the control module 305 can retrieve the point sum value from the point sum field 425 from the forum user profile record 400 and compare the point sum value from a predetermined reward threshold.

If the user is eligible for a reward, the control module 305 can notify the user, in step 935. Specifically, the control module 305 can generate a GUI notification, a link to the GUI notification or an electronic mail notification message that informs the user is eligible for a reward from the incentive reward program. The notification can also provide GUI widgets that provide options to select either to redeem the current reward or continue to accumulate incentive points for other high valued rewards. Subsequently, the control module 305 can retrieve the next forum profile record for processing, in step 905.

Otherwise, if the user is not eligible for a reward, the control module 305 can be configured to determine whether the use is eligible to be promoted in step 940. Particularly, the control module 305 can retrieve a rating point sum from the rating point field 430B from the forum user profile record and compare the rating point sum with a predetermined rating threshold.

If the user is not eligible for a promotion, the control module 305 can then retrieve the next forum user profile record, in step 905. Otherwise, the control module 305 can send a notification message via a electronic message (electronic mail, instant message, etc.) to the user notifying the user of the promotion, in step 945.

In step 950, the control module 305 can then update the rating field 430A with the promotion and return the forum user profile to the forum user profile database 340. Subsequently, the control module 305 can then retrieve the next forum user profile record, in step 905.

Figure 10:
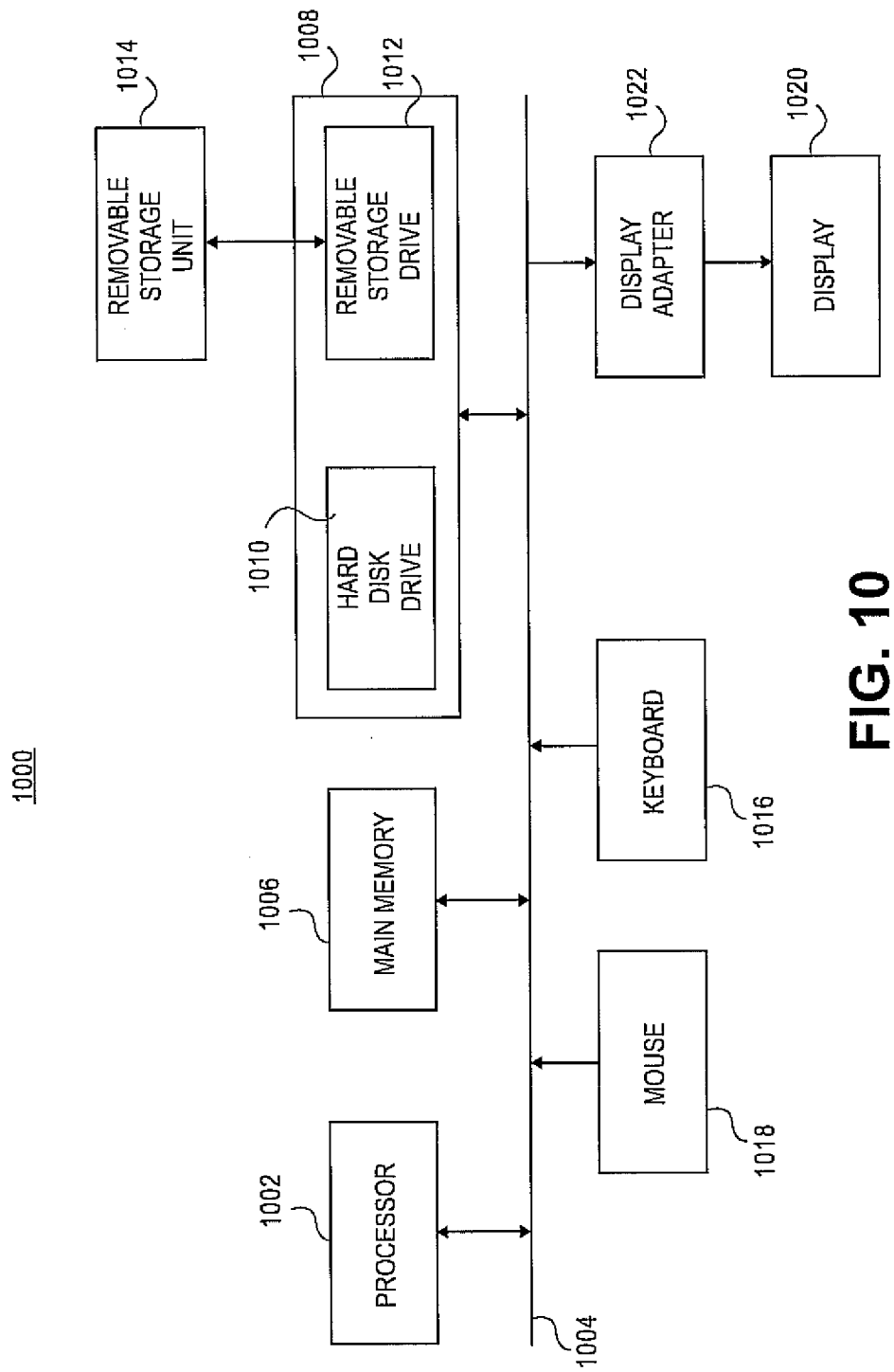
FIG. 10 depicts an exemplary computing platform in accordance with yet another embodiment.

FIG. 10 illustrates an exemplary block diagram of a computing platform 1000 where an embodiment may be practiced. The functions of the tiered incentive module 135 may be implemented in program code and executed by the computing platform 1000. The tiered incentive module 135 may be implemented in computer languages such as PASCAL, C, C++, JAVA, etc.

As shown in FIG. 10, the computer system 1000 includes one or more processors, such as processor 1002 that provide an execution platform for embodiments of the tiered incentive module 135. Commands and data from the processor 1002 are communicated over a communication bus 1004. The computer system 1000 also includes a main memory 1006, such as a Random Access Memory (RAM), where the tiered incentive module 135 may be executed during runtime, and a secondary memory 1008. The secondary memory 1008 includes, for example, a hard disk drive 1010 and/or a removable storage drive 1012, representing a floppy diskette drive, a magnetic tape drive, a compact disk drive, etc., where a copy of a computer program embodiment for the tiered incentive module 135 may be stored. The removable storage drive 1012 reads from and/or writes to a removable storage unit 1014 in a well-known manner. A user interfaces with the tiered incentive module 135 with a keyboard 1016, a mouse 1018, and a display 1020. The display adapter 1022 interfaces with the communication bus 1004 and the display 1020. A display adapter 1022 also receives display data from the processor 1002 and converts the display data into display commands for the display 1020.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
registering a user to a forum, wherein the user is a new user who has not previously contributed to the forum;
initializing a probationary sum for the user that corresponds to a probationary status for the user, wherein the user is not eligible for an incentive program while the user is in the probationary status;
detecting that an answer has been posted in the forum;
retrieving a user identification associated with the answer;
querying a user profile database with (a) the user identification associated with the answer and (b) a request for status associated with the user identification as search terms;
determining, in view of a response received from the user profile database, that the answer posted in the forum was provided by the user and that the user has the probationary status,
  invoking a user interface module to generate an evaluation form with respect to the answer, the evaluation form comprising a first GUI widget through which probationary points can be added to the probationary sum and a second GUI widget through which a rating can be provided with respect to the answer, and
  forwarding, via a network the evaluation form, as generated by the user interface module, and the answer to a peer review group comprising members of a user community that are qualified, in view of the incentive program, to be reputable with respect to the answer;
in response to a selection of the first GUI widget by one or more members of the user community that are qualified, in view of the incentive program, to be reputable with respect to the answer, adding, by a processor, probationary points awarded by the peer review group to the probationary sum in view of the answer;
providing, via the network, an update to elevate a status of the user in the user profile database in response to the probationary sum exceeding a predetermined threshold, wherein the user is eligible for the incentive program while the user is in the elevated status;
in view of the update, changing the status of the user from the probationary status to a rated user status;
monitoring at least one answer posted by the rated user in the forum;
determining, in view of the monitoring, whether the user is eligible for an award from the incentive program; and
in response to a determination that the user is eligible for the reward from the incentive program, generating a GUI notification, the GUI notification comprising a third GUI widget that provides an option to redeem the reward.

2. The method of claim 1, further comprising evaluating the answer in view of a predetermined criteria to assess the associated probationary points.

3. The method of claim 1, further comprising:
assessing a number of incentive points for the at least one answer; and
accumulating the incentive points for an incentive point sum.

4. The method of claim 3, further comprising determining whether the incentive point sum exceeds a rewards threshold.

5. The method of claim 4, further comprising awarding a predetermined reward in response to the incentive point sum exceeding the reward threshold.

6. The method of claim 4, further comprising providing a predetermined reward and applying the incentive point sum to a second reward threshold in response to the incentive point sum exceeding the reward threshold.

7. A system comprising:
a memory; and a processor operatively coupled to the memory, wherein
the processor is to:
  register a user to a forum, wherein the user is a new user
    who has not previously contributed to the forum;
  initialize a probationary sum for the user that corresponds to a probationary status for the user, wherein
    the user is not eligible for an incentive program
    while the user is in the probationary status;
  detect that an answer has been posted in the forum;
  retrieve a user identification associated with the
    answer;
  query a user profile database with (a) the user identification associated with the answer and (b) a request
    for status associated with the user identification as
    search terms;
  determine, in view of a response received from the user
    profile database, that the answer posted in the forum
    was provided by the user and that the user has the
    probationary status,
    invoke a user interface module to generate an evaluation form with respect to the answer, the evaluation form comprising a first GUI widget through
      which probationary points can be added to the
      probationary sum and a second GUI widget
      through which a rating can be provided with
      respect to the answer, and
    forward, via a network, the evaluation form, as
      generated by the user interface module, and the
      answer to a peer review group, comprising members of a user community that are qualified, in
      view of the incentive program, to be reputable
      with respect to the answer;
  in response to a selection of the first GUI widget by one
    or more members of the user community that are
    qualified, in view of the incentive program, to be
    reputable with respect to the answer, add probationary points awarded by the peer review group to the
    probationary sum in view of the answer;
  provide, via the network, an update to elevate a status
    of the user in the user profile database in response to
    the probationary sum exceeding a predetermined
    threshold, wherein the user is eligible for the incentive program while the user is in the elevated status;
  in view of the update, change the status of the user from
    the probationary status to a rated user status;
  monitor at least one answer posted by the rated user in
    the forum;
  determine, in view of the monitoring, whether the user
    is eligible for an award from the incentive program;
    and
  in response to a determination that the user is eligible
    for the reward from the incentive program, generate
    a GUI notification, the GUI notification comprising
    a third GUI widget that provides an option to redeem
    the reward.

8. The system of claim 7, wherein the processor is further to provide at least one predetermined criteria to assess the probationary points for the answer.

9. The system of claim 7, wherein the processor is further to:
  assess a number of incentive points for at least one answer; and
  accumulate the incentive points for an incentive point sum.

10. The system of claim 9, wherein the processor is further to determine whether the incentive point sum exceeds a rewards threshold.

11. The system of claim 10, wherein the processor is further to award a predetermined reward in response to the incentive point sum exceeding the reward threshold.

12. The system of claim 10, wherein the processor is further to:
  provide a predetermined reward; and
  apply the incentive point sum to a second reward threshold in response to the incentive point sum exceeding the reward threshold.

13. An apparatus comprising:
a memory; and
a processor and operatively coupled to the memory,
  wherein the processor is to:
  register a user to a forum, wherein the user is a new user
    who has not previously contributed to the forum;
  initialize a probationary sum for the user that corresponds to a probationary status for the user, wherein
    the user is not eligible for an incentive program
    while the user is in the probationary status;
  detect that an answer has been posted in the forum;
  retrieve a user identification associated with the
    answer;
  query a user profile database with (a) the user identification associated with the answer and (b) a request
    for status associated with the user identification as
    search terms;
  determine, in view of a response received from the user
    profile database, that the answer posted in the forum
    was provided by the user and that the user has the
    probationary status,
    invoke a user interface module to generate an evaluation form with respect to the answer, the evaluation form comprising a first GUI widget through
      which probationary points can be added to the
      probationary sum and a second GUI widget
      through which a rating can be provided with
      respect to the answer, and
    forward, via a network, the evaluation form, as
      generated by the user interface module, and the
      answer to a peer review group comprising members of a user community determined, in view of
      the incentive program, to be reputable with respect
      to the answer;
  in response to a selection of the first GUI widget by one
    or more members of the user community that are
    qualified, in view of the incentive program, to be
    reputable with respect to the answer, add probationary points awarded by the peer review group to the
    probationary sum in view of the answer;
  provide, via the network, an update to elevate a status
    of the user in the user profile database in response to
    the probationary sum exceeding a predetermined
    threshold, wherein the user is eligible for the incentive program while the user is in the elevated status;
  in view of the update, change the status of the user from
    the probationary status to a rated user status;
  monitor at least one answer posted by the rated user in
    the forum;
  determine, in view of the monitoring, whether the user
    is eligible for an award from the incentive program;
    and
  in response to a determination that the user is eligible
    for the reward from the incentive program, generate
    a GUI notification, the GUI notification comprising
    a third GUI widget that provides an option to redeem
    the reward.

14. The apparatus of claim 13, wherein the processor is further to provide at least one predetermined criteria to assess the probationary points for the answer.

15. The apparatus of claim 13, wherein the processor is further to
   assess a number of incentive points for at least one answer; and
   accumulate the incentive points for an incentive point sum.

16. The apparatus of claim 15, wherein the processor is further to determine whether the incentive point sum exceeds a rewards threshold.

17. The apparatus of claim 16, wherein the processor is further to award a predetermined reward in response to the incentive point sum exceeding the reward threshold.

18. The apparatus of claim 16, wherein the processor is further to provide a predetermined reward; and
   apply the incentive point sum to a second reward threshold in response to the incentive point sum exceeding the reward threshold.

* * * * *